May 2, 1933.   G. H. SCHWEDERSKY   1,907,265
COOKING UTENSIL
Filed Feb. 13, 1932    2 Sheets-Sheet 1

Inventor
George H. Schwedersky,

By Clarence A. O'Brien
Attorney

May 2, 1933. G. H. SCHWEDERSKY 1,907,265
COOKING UTENSIL
Filed Feb. 13, 1932 2 Sheets-Sheet 2
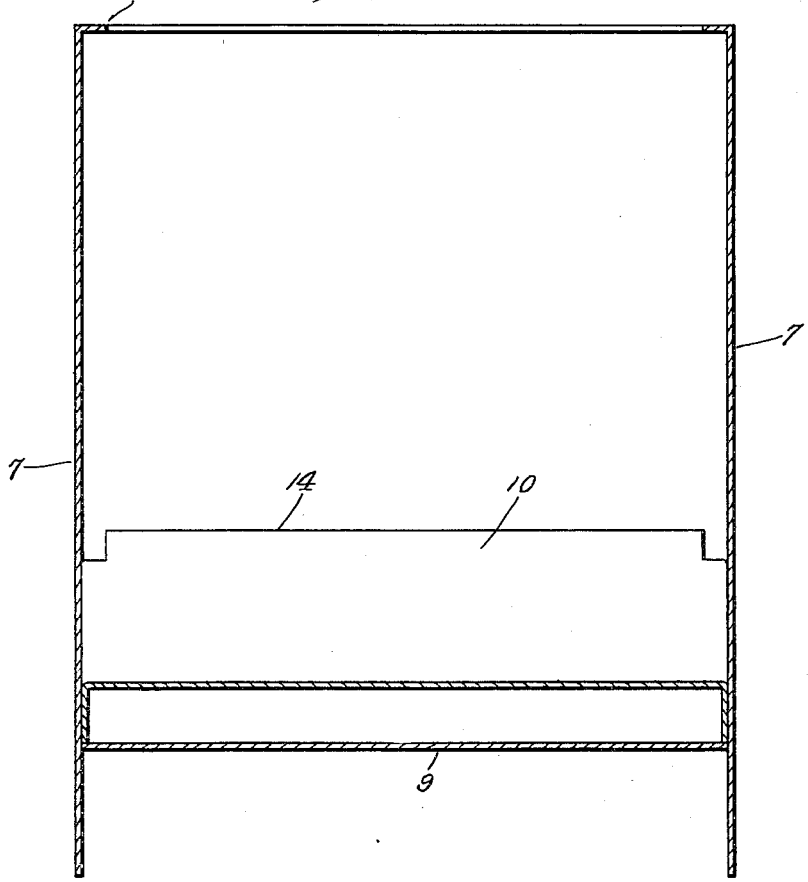
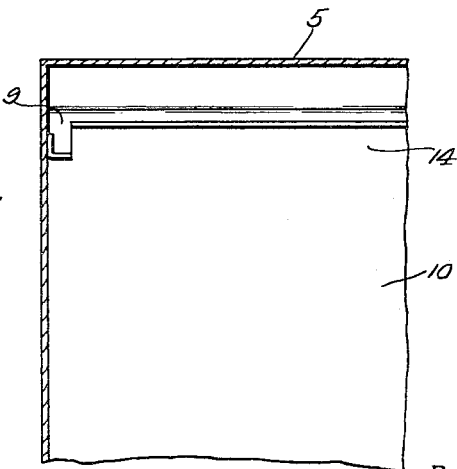
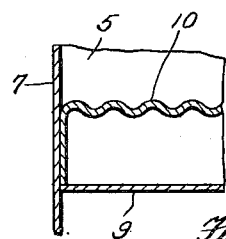
Inventor
George H. Schwedersky,
By Clarence A. O'Brien
Attorney Patented May 2, 1933

1,907,265

UNITED STATES PATENT OFFICE

GEORGE H. SCHWEDERSKY, OF PROVIDENCE, RHODE ISLAND

COOKING UTENSIL

Application filed February 13, 1932. Serial No. 592,786.

This invention appertains to new and useful improvements in cooking utensils, and more particularly to a kettle for the type used for deep fat or oil frying in restaurants, hotels, and like places.

The chief features distinguishing this kettle from others now on the market, are the heating of the oil or fat between an inclined bottom and a superplate, which plate separates the oil which is heating from the remainder of the oil in the kettle; and the inclination of the bottom and the plate as to produce more rapid thermal circulation and consequently quicker heating of all the fat or oil and more uniform temperature throughout the kettle.

Other important objects and advantages of the invention will become apparent to the reader of the following specification.

In the drawings:—

Fig. 2 represents a vertical sectional view taken substantially on line 2—2 of Fig. 1.

Fig. 3 represents a sectional view taken substantially on line 3—3 of Fig 1.

Fig. 4 represents a sectional view taken substantially on line 4—4 of Fig. 1.

Figure 1:
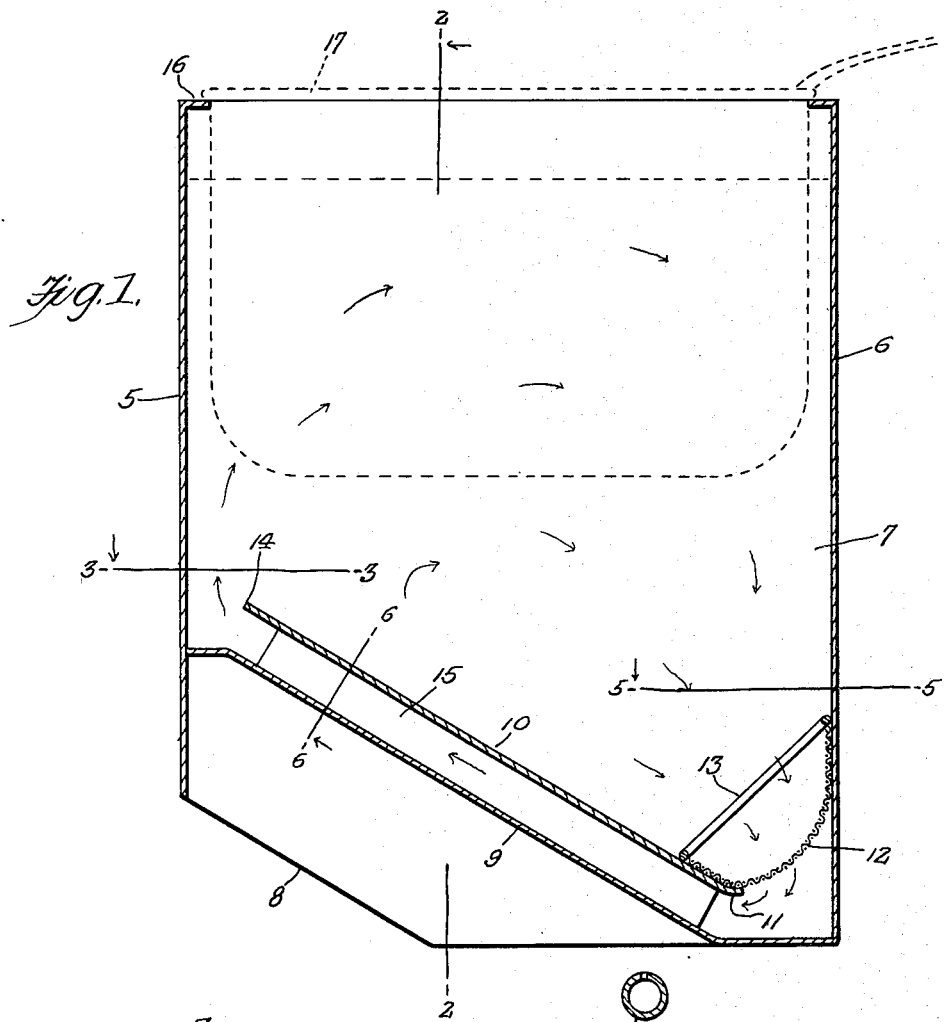
Figure 1 represents a vertical sectional view through the kettle.
Figure 5:
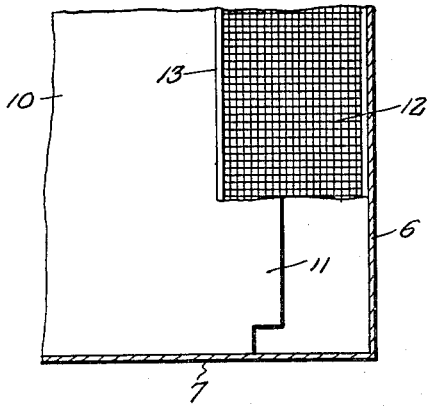
Fig. 5 represents a fragmentary detailed sectional view taken substantially on line 5—5 of Fig. 1.
Figure 6:
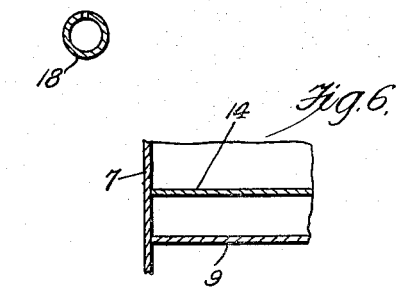
Fig. 6 represents a sectional view taken substantially on line 6—6 of Fig. 1.

Referring to the drawings wherein like numerals designate like parts it can be seen that the novel kettle structure includes end walls 5—6 and side walls 7—7. The end wall 5 is substantially shorter than the end wall 6 and one lower corner of each of the side walls 7 is cut away as at 8 to merge with the short end wall 5 at its lower end.

The kettle shell, made up of the above walls includes the inclined bottom 9 and the internal plate 10 which is disposed above the same and disposed in parallel relation therewith. The lower end of this plate 10 is provided with a slightly upwardly curved extension 11 upon which rests the transversely curved screen or strainer 12, having the reinforcing frame or rim 13. The upper end of the plate 10 is provided with a slightly reduced extension 14 terminating in spaced relation to the end wall 5 and providing depending side flanges 15 which rest upon the bottom 9.

The plate 10 is preferably of the corrugated type, with the corrugations extending vertically thereon. The upper ends of the walls 5, 6 and 7—7 are provided with inwardly extending flanges 16 for supporting a cooking utensil 17.

Numeral 18 represents a burner or other heating element which is situated beneath the kettle at the lower end of the bottom 9. The heat from the burner or other heating element 18 will sweep upwardly along the lower side of the bottom 9.

Obviously, oil in the container, as it is heated, will rise in the space between the bottom 9 and the plate 10 and will travel in the direction of the arrows. As the oil becomes cooled, the same will descend through the strainer 12 and regain the lower end of the passageway between the bottom 9 and the plate 10 whereupon it will become heated again and as it travels upwardly along the bottom 9.

Obviously, this circulation of the oil promotes uniform temperature in the kettle and obviously affords a far more efficient utensil than utensils of this type now on the market.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. A kettle of the character described comprising a container provided with an inclined bottom, an internal solid plate inclined in parallel relation to the bottom and being spaced at its upper end from the side walls and at its lower end from the bottom, and a strainer at the lower end of the internal plate.

2. A kettle of the character described comprising a container provided with an inclined bottom, an internal plate in parallel relation to the bottom and being spaced at its upper end from the side walls and at its lower end from the bottom, a strainer at the lower end of the passageway, said plate at its lower end being curved to provide a seat for the strainer, said strainer being transversely curved and provided with a reinforcing frame.

In testimony whereof I affix my signature.

GEORGE H. SCHWEDERSKY.